United States Patent [19]

Lupke

[11] Patent Number: 5,372,774
[45] Date of Patent: Dec. 13, 1994

[54] PROCESS OF AND APPARATUS FOR MAKING PLASTIC TUBING

[75] Inventor: Manfred A. A. Lupke, Concord, Canada

[73] Assignee: Corma, Ontario, Canada

[21] Appl. No.: 854,988

[22] PCT Filed: Oct. 29, 1990

[86] PCT No.: PCT/CA90/00372
§ 371 Date: Nov. 2, 1992
§ 102(e) Date: Nov. 2, 1992

[87] PCT Pub. No.: WO91/06419
PCT Pub. Date: May 16, 1991

Related U.S. Application Data

[63] Continuation-in-part of Ser. No. 428,635, Oct. 30, 1989, abandoned.

[51] Int. Cl.$^5$ .............. B29C 33/26; B29C 33/36; B29C 49/00; B29C 59/00
[52] U.S. Cl. .............. 264/508; 198/465.2; 264/209.3; 264/334; 264/564; 425/233; 425/326.1; 425/336; 425/342.1; 425/377; 425/387.1; 425/396; 425/442; 425/451; 425/451.4; 425/453; 425/DIG. 54; 425/DIG. 108
[58] Field of Search .............. 264/209.3, 286, 334, 264/508, 564; 425/233, 326.1, 327, 335, 336, 342.1, 377, 387.1, 394, 396, 441, 442, 451, 451.4, 453, DIG. 5, DIG. 54, DIG. 108, DIG. 200; 249/170; 198/465.2

[56] References Cited

U.S. PATENT DOCUMENTS

| | | |
|---|---|---|
| 1,892,126 | 12/1932 | Bailey . |
| 3,677,676 | 7/1972 | Hegler ............ 425/377 X |
| 3,751,541 | 8/1973 | Hegler ............ 264/508 |
| 3,779,684 | 12/1973 | Folkes ............ 425/233 |
| 3,832,429 | 8/1974 | Charpentier ............ 264/51 |
| 3,981,663 | 9/1976 | Lupke ............ 425/326.1 |
| 4,319,872 | 3/1982 | Lupke et al. ............ 425/326.1 X |
| 4,365,948 | 12/1982 | Chaplain ............ 264/508 X |
| 4,439,130 | 3/1984 | Dickhut et al. ............ 425/388 |
| 4,787,598 | 11/1988 | Rahn ............ 425/396 X |
| 4,911,633 | 3/1990 | Comfort ............ 425/396 |

FOREIGN PATENT DOCUMENTS

| | | |
|---|---|---|
| 902314 | 6/1972 | Canada . |
| 7556 | 2/1980 | European Pat. Off. . |
| 270694 | 6/1988 | European Pat. Off. . |
| 1171596 | 6/1964 | Germany . |

*Primary Examiner*—Leo B. Tentoni
*Attorney, Agent, or Firm*—Beveridge, DeGrandi, Weilacher & Young

[57] ABSTRACT

The invention concerns apparatus for molding tube (20) utilizing a travelling mold tunnel. The tunnel is made up of mold blocks (16) each comprising parts (13, 15) which are hinged together to be closeable to form the tunnel and openable to release tube from the tunnel. The opened mold blocks (16) from the downstream end of the tunnel are opened and returned to the upstream end without change in their orientation to reform the tunnel about an extrusion nozzle (18) for thermoplastic extrudate.

30 Claims, 9 Drawing Sheets

PROCESS OF AND APPARATUS FOR MAKING PLASTIC TUBING

This is a continuation-in-part of 07/428,635, filed Oct. 30, 1989, now abandoned.

This invention relates to apparatus, having travelling mold tunnel for the production of seamless plastic tubing, especially single or double-walled corrugated tubing or ribbed tubing.

BACKGROUND ART

Apparatus of utilizing a travelling mold tunnel is commonly used for the production of continuous plastic tubing. The mold tunnel is formed between a pair of complementary mold assemblies each of which comprises an endless run of mold blocks which are articulately interconnected. Each mold block of one mold assembly is complementary to a respective mold block of the other mold assembly, the mold blocks cooperating in pairs along the forward run to form an axially extending mold tunnel defining a tubular mold. The wall of the mold is dependent on the inner face of the mold blocks and is the matter of choice.

The mold assemblies are driven in synchronism with one another so that the mold blocks circulate along the endless tracks. The mold blocks are always located similarly with respect to the direction of their movement. Thus when the direction of movement changes, the orientation of the mold blocks changes with it. For example, the mold blocks on the return run are totaled 90° with respect to mold blocks on the tunnel run. The entrance to the tunnel may be located suitably with respect to an extrusion nozzle for extruding an annular parison of plastic against the mold surface of the tunnel. When the resulting tube is required to have more than one wall, the extrusion nozzle will extrude coaxial parisons of plastic extrudate.

Such apparatus is described in U.S. Pat. No. 3,981,663 to Lupke, issued Sep. 21, 1976 and U.S. Pat. No. 3,832,429 to Charpentier 1974. These patents describe apparatus in which the mold assemblies are arranged one above the other. Other conventional apparatus in use is described, for example in U.S. Pat. Nos. 3,677,676 to Hegler 1972, and 3,751,541 to Haglet 1973. The apparatus of these patents shows the mold assemblies arranged side-by-side. Both these conventional configurations of apparatus have particular problems associated with them, in that the independent mold assemblies must be carefully synchronized in operation so that the pairs of cooperating mold blocks come together precisely to form the mold tunnel. Moreover, to provide a pair of independent mold assemblies requires considerable duplication of machinery and equipment and, in the case of the side-by-side layout, the apparatus covers an appreciable area of floor space which may be an appreciable consideration where space is limited or expensive.

Any services which must be supplied to the mold blocks must be provided in duplicate for each mold assembly. Such services include the provision of suction lines, hydraulic fluid lines, possibly heating or cooling services, etc., maintenance and repair work is also duplicated for the mechanism of each endless track. U.S. Pat. No. 4,439,130 issued Mar. 27, 1984 to Dickhut discloses the use of mold blocks which are hinged together and closed to form the mold tunnel and opened to release formed pairs of tube. This makes possible for a single conveyor but the mold blocks still change orientation with changes in their direction of travel.

The use of hinged mold blocks which are closed to form the mold tunnel and are opened to release a formed tube is disclosed in the DE-B-1 171 596. The hinged mold blocks are fixed to a conveyor chain and circulate with this chain arround sprocket-wheels. During their travel on the return path the mold blocks change their direction over an angle of 360°.

Since the 1970's various improvements and modifications have been made to the basic type apparatus disclosed in the patents referred to but except for the manufacture of helically corrugated tube no other basic type of apparatus is known. For the production of helically corrugated pipe, a ribbon of molten thermoplastic has been wound on an advancing mandrel. It is not with this type of apparatus that the present invention is concerned.

DISCLOSURE OF THE INVENTION

According to the invention, apparatus for continuous molding of thermoplastic extrudate e.g. tube, in a travelling mold tunnel to form an elongate molding, comprises; a travelling tunnel mold assembly of adjacent mold blocks each mold block having a bore therethrough, the bores of adjacent mold blocks being aligned axially; each mold block comprising a pair pivotally connected parts whereby the parts are movable between a closed position of the block in which the bore is circumferentially enclosed, and an open position in which the parts are located with respect to each other release elongate molding formed between them; a tunnel conveyor for the tunnel mold assembly to convey it horizontally and axially in a molding run between tunnel entrance and a tunnel exit; means to open each mold block as it reaches the tunnel exit; means to return each mold block on a return path from the tunnel exit to the tunnel entrance upstream of the return path, and means to close the returned mold blocks to form the mold tunnel; the mold block being of fixed orientation with its bore parallel to the tunnel axis during travel on all of the return path to be added to the tunnel entrance. The invention is envisaged for use in the molding of semi-rigid plastic tube of the type used for underaround drainage or for carrying electrical wiring. The cross-section of such tube is generally circular. For easy exchange of mold blocks for ones of different diameter, each mold block may be releasably carried on a mold block carrier articulately interconnected mold block carriers.

The means to return each mold block from the tunnel exit to the tunnel entrance may comprise; a removal conveyor arranged to move generally in the plane of the tunnel conveyor to receive and convey each opened mold block sequentially from the tunnel conveyor, each mold block being orientated with its bore parallel to the mold tunnel; a return conveyor generally in the plane of the tunnel conveyor arranged to move horizontally parallel and opposite to the tunnel conveyor to receive and convey mold blocks sequentially from the removal conveyor, each mold block being orientated with its bore parallel to the mold tunnel; and an approach conveyor arranged to move horizontally and parallel to the removal conveyor, to convey mold blocks sequentially from the return conveyor, each mold block being orientated with its bore parallel to the mold tunnel. Means may be provided to maintain the mold blocks closed on the tunnel conveyor. Such means may suitably be either guide fences to prevent the mold block parts pivoting away from each other or a cam actuated latches between the mold parts.

When the cam actuated latch is provided, the latching cam may be located at the upstream end of the tunnel to engage a first cam surface of the latch to move it into a latching position as the respective mold block is conveyed on the tunnel conveyor past the cam, and an unlatching cam may be located at the downstream end of the tunnel to engage a second cam surface of the latch to move it into a latching position as the respective mold block is conveyed or the tunnel conveyor past the cam. In effect, such a latch may be a toggle latch. Once the hinged parts of the mold blocks are unlatched, the mold blocks must physically open to release tube formed in the mold tunnel. This may be achieved through mold block opening cam means provided at the downstream end of the tunnel, adapted to interact with a cam surface of one mold block part to pivot it with respect to the other mold block part to release the tube. Once the tube has been released, the mold blocks may travel on the removal return and approach conveyors, in either open or closed condition. However, since the mold blocks must open to receive an extrusion nozzle into the tunnel, it is convenient to maintain the mold blocks open on the removal, return and approach conveyors. At the upstream end of the tunnel, mold blocks pivotally close under gravity. Preferably, such closing is in a controlled manner and mold block closing cam means may be provided to interact with a cam surface of each mold block to close it as it moves into position as part of the mold tunnel.

A change of direction is involved between different conveyors and guide means may be provided to guide the mold blocks from one conveyor to the next. Such guide means may comprise a curved guide rails at outer corners between each conveyor.

The hinging of the mold block parts may be by any convenient arrangement. However, two such arrangements, referred to as exemplary, are envisaged. In both arrangement, the hinge is provided near the top of the mold block, but in one case it is right at the top, and, in the other case, it is offset from the top. In each case, one fixed part of each pair of mold block parts is, in use, attached at its base to its respective mold block carrier. In the case where the hinge is at the top of the mold block, abutting faces of the block of the fixed and movable parts distant from the hinge, lie in a plane oblique to the radius of the bore. By this means it is possible to attach the fixed part over a stable base area. Moreover, connection between the fixed and movable parts on the outside of the mold block may be offset from the direct bottom, thus allowing access to latching means. In the case where the hinge is offset from the top of the mold block, the fixed and movable parts may be symmetric. The face abutting faces may be radial and offset from the bottom of the mold block diametrically opposite the hinge. When this is so, it may be necessary to lower-the mold block slightly to release tube from the slightly upstanding edge of the fixes mold block. This may be achieved by making the conveyor run descend slightly. In this case, means are provided to lower the mold blocks on the tunnel A change of direction is involved between different conveyors and guide means may be provided to guide the mold blocks from one conveyor to the next, Such guide means may comprise a curved guide rails at outer corners between each conveyor.

The hinging of the mold block parts may be by any convenient arrangement. However, two such arrangements, referred to as exemplary, are envisaged. In both arrangement, the hinge is provided near the top of the mold block, but in one case it is right at the top, and, in the other case, it is offset from the top. In each case, one fixed part of each pair of mold block parts is, in use, attached at its base to its respective mold block carrier. In the case where the hinge is at the top of the mold block, abutting faces of the block of the fixed and movable parts distant from the hinge, lie in a plane oblique to the radius of the bore. By this means it is possible to attach the fixed part over a stable base area. Moreover, connection between the fixed and movable parts on the outside of the mold block may be offset from the direct bottom, thus allowing access to latching means. In the case where the hinge is offset from the top of the mold block, the fixed and movable parts may be symmetric. The face abutting faces may be radial and offset from the bottom of the mold block diametrically opposite the hinge. When this is so, it may be necessary to lower the mold block slightly to release tube from the slightly upstanding edge of the fixed mold block. This may be achieved by making the conveyor run descend slightly. In this case, means are provided to lower the mold blocks on the tunnel conveyor to release formed tube from the face of the fixed mold part offset from the base. In any case, it may be convenient to provide ramps between conveyors.

The invention also provides a method for continuous molding of thermoplastic extrudate in a travelling mold tunnel to form an elongate molding, comprising: extruding a parison of thermoplastic extrudate into a travelling tunnel mold assembly of adjacent mold blocks each mold block having a bore therethrough, the bores of adjacent mold blocks being aligned axially; each mold block comprising a pair pivotally connected parts whereby the parts are movable between a closed position of the block in which the bore is circumferentially enclosed, and an open position in which the parts are located, with respect to each other, to release elongate molding formed between them; conveying the tunnel mold assembly horizontally and axially in a molding run from between a tunnel entrance and a tunnel exit; opening each mold block as it reaches the tunnel exit; returning each mold block on a return path from the tunnel exit to the tunnel entrance upstream of the return path; and closing the returned mold blocks to form the mold tunnel; the mold block being held in fixed orientation with its bore parallel to the tunnel axis during travel on all of the return path to be added to the tunnel entrance. The method may be used for molding tube. In particular, the mold block bore may be circular in cross-section. Each mold block may be carrier on a mold block carrier.

The mold blocks may be returned from the tunnel exit to the tunnel entrance by the following steps: removing opened mold blocks from the tunnel conveyor into a removal conveyor generally running in the plane of the tunnel conveyor, and receiving and conveying each opened mold block sequentially from the tunnel conveyor, each mold block being orientated with its bore parallel to the mold tunnel; and transferring the opened mold blocks from the removal conveyor to a return conveyor generally in the plane of the tunnel conveyor running horizontally parallel and opposite to the tunnel conveyor, and receiving and conveying mold blocks sequentially from the removal conveyor, each mold block being orientated with its bore parallel to the mold tunnel; and transferring the mold blocks from the return conveyor to an approach conveyor generally in the plane of the tunnel conveyor running horizontally and parallel to the removal conveyor, receiving and conveying mold blocks sequentially from the return conveyor, each mold block being orientated with its bore parallel to the mold tunnel. The mold blocks closed on the tunnel conveyor may be latched. Furthermore the mold blocks may be opened at the tunnel exit by a cam channel slidably engaging a lug of each mold block the channel rising to lift the respective mold block part and thereby open the mold block. The mold blocks may be maintained open on the removal, return and approach conveyors. Alternatively the mold blocks may be opened and closed through rotation of a screw threaded spindle acting to adjust the axial location of a member in screw threaded engagement therewith, through articulated linkage with the respective mold block parts.

BRIEF DESCRIPTION OF THE DRAWINGS

Embodiments of the invention will now be described by way of example with reference to the drawings in which.

MODES OF CARRYING OUT THE INVENTION

Figure 1:
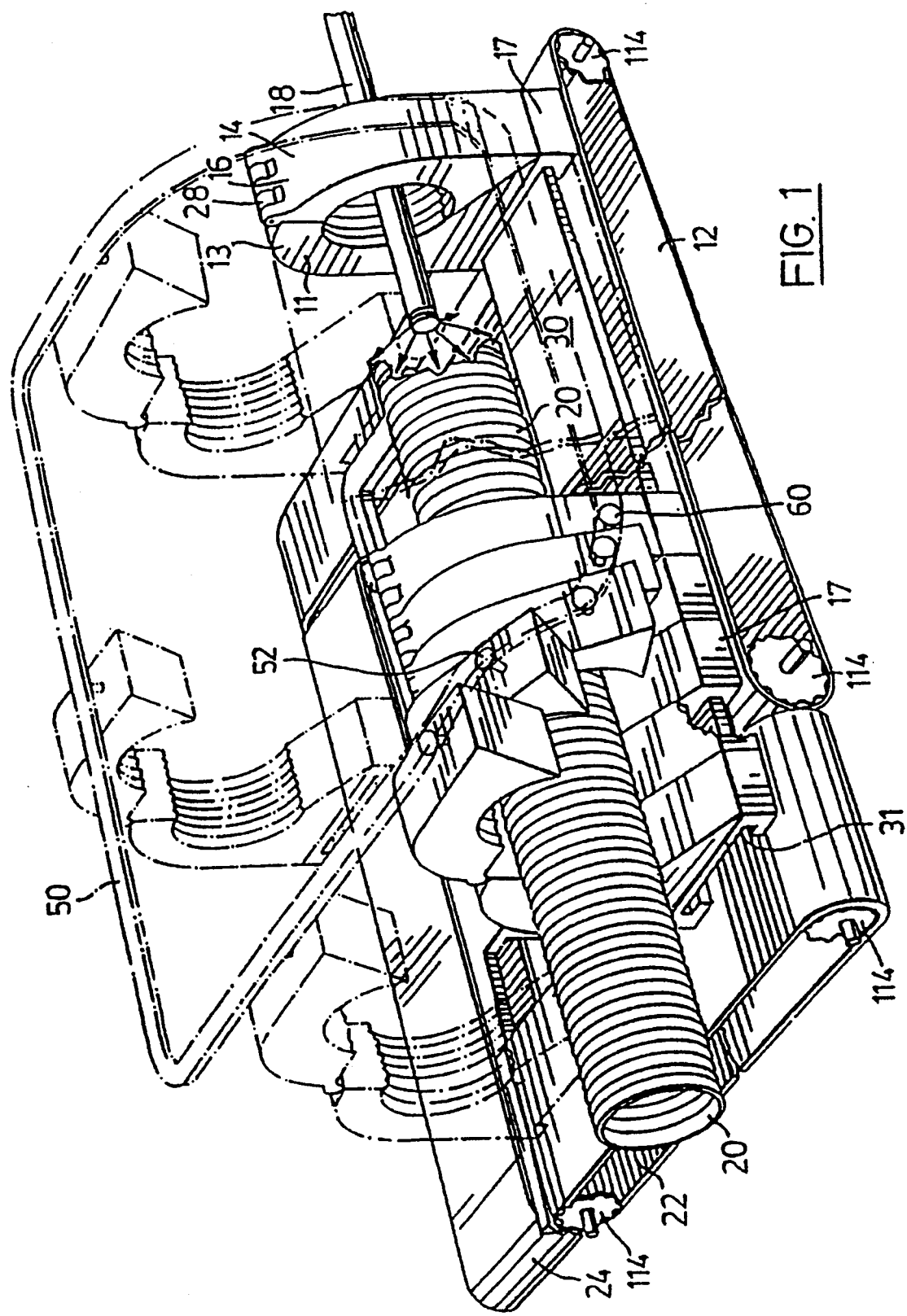
FIG. 1 is a perspective view of an embodiment of apparatus according to the invention.
Figure 2:
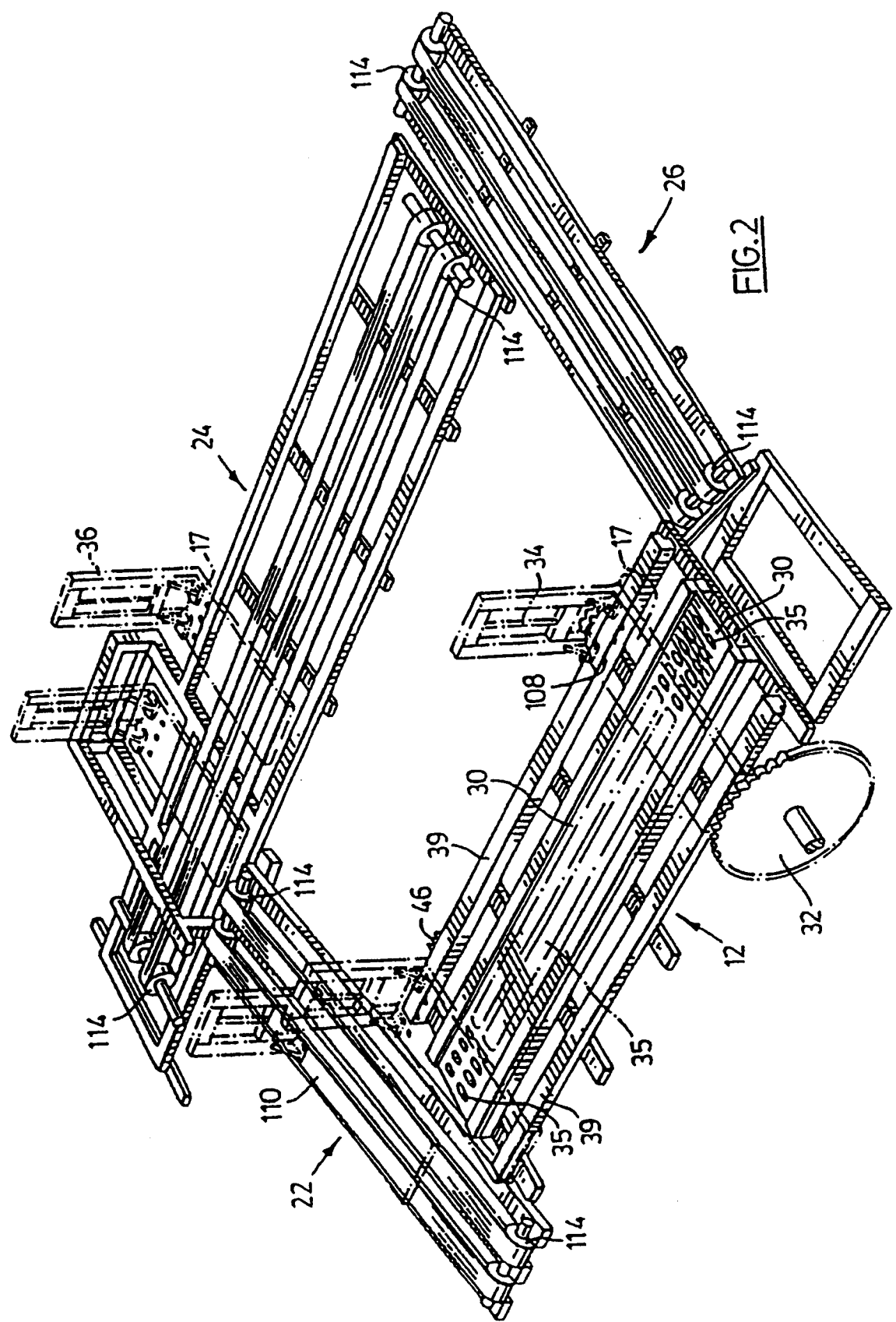
FIG. 2 shows a plan view of the general layout for another embodiment apparatus of the invention.

In the drawings, FIG. 1 shows a general view of apparatus embodying the invention which may comprise a tunnel conveyor 12 along which travels a tunnel mold assembly 14, segments of which are hinged mold blocks 16 of which are closed in the tunnel mold assembly over the majority of tunnel run of a conveyor 12. Each mold block 16 comprises a fixed half 13 and a hinged half 15 and each has a carrier block 17 which may be driven to move along the conveyor 12 in a manner to be described hereafter. At an upstream end of the tunnel assembly 14, an extrusion nozzle 18 enters the tunnel to extrude an annular parison 19 of thermoplastic material to form tube 20 within the tunnel. At the downstream end of the tunnel assembly, tube 20 emerges from the tunnel. Also at the downstream end of the tunnel, mold blocks 16 open hingeably to release tube 20 and are returned to the upstream end of the tunnel conveyor 12 by means of a removal conveyor 22, a return conveyor 24 and an approach conveyor 26. Conveniently, the tunnel conveyor 12 and the removal conveyor 22, the return conveyor 24 and the approach conveyor 26 are laid out in the general form of a rectangle, the upper runs of each conveyor being at least generally in the same horizontal plane. While the speeds of the various conveyors may be coordinated to return mold blocks to the tunnel conveyor at a suitable speed to form the tunnel assembly 14 on the tunnel conveyor, in a practical embodiment the tunnel conveyor comprises a stationary conveyor along which the mold blocks 16 are driven via their carriers 17.

On the removal, return and approach conveyors 22, 24 and 26 the mold blocks may travel in either an open or closed condition. However, since the mold blocks must open to release tube 20, and must be open in order to close around extrusion nozzle 18, it may normally be convenient for them to travel on at least most of the route back to the upstream end of the tunnel conveyor 12 in the open condition. Mold blocks halves may open as much as 180° to each other or even more. However, it is normally convenient that they only open widely enough to release tube 20 from betwen them.

When assembled into mold tunnel assembly 14 on tunnel conveyor 12, it is important that the mold blocks 16 have upstream faces and downstream faces 11 in contact with one another to form a closed tunnel in the longitudinal direction. It may normally be sufficient to press the mold blocks firmly together on this run but it may be advantageous to mechanically link the carriers, as for instance, by the illustrated tongue 100 and groove 102 connections between them as seen from FIG. 8. The halves 13, 15 of each mold block 16 must, on the tunnel run tightly closed about the hinge 28 so that the tunnel is also tightly closed around its circumference, and must reliably open to release tube 20. This may be achieved by various means, for example the cam arrangement 50, 5a shown in FIG. 1 or the mechanism 104 shown in FIGS. 9 and 10.

The alignment of the mold blocks 16 on the tunnel conveyor 12 is also important so that the extrusion nozzle 18 is accurately centered in the tunnel for accuracy in molding the tube 20. Conveniently, a track 30 is provided on tunnel conveyor 12 for engagement with a corresponding part 31 of each carrier 17 for guidance and location of mold block 16. The track 30 may be in the form of an upstanding rail to cooperate with a groove 31 shaped slot 31 of each mold block. The rail 30 may house a source of suction and suction passages 33 through carrier 17 may connect suction ports 35 of the rail 30 with suction passages 37 in the mold block 16 leading to its interior. The provision of suction to the interior of the tunnel may be provided in a similar manner to that described in any of U.S. Pat. No. 4,319,872 or Canadian patent No. 1,083,765, these patents are directed to a travelling mold comprising mold blocks through which suction may be applied, although all of the patents are limited to the use of two conveyor systems, one for each of two runs of half mold blocks. Nevertheless, the provisions of suction means within guides for the mold blocks may be regarded as similar.

Figure 9:
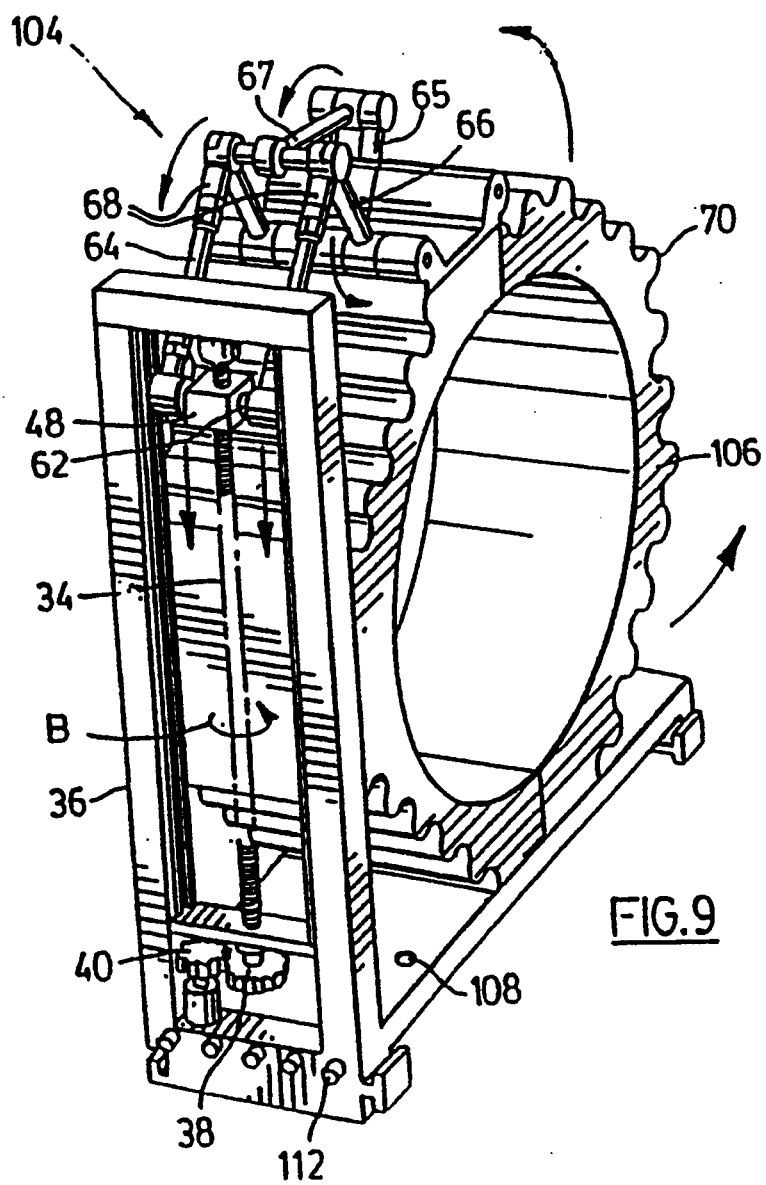
FIG. 9 is a view of another closed mold block in combination with a carrier as shown in FIG. 8 indicating mold opening and closing mechanism.

Suitably the carriers 17 "wrap around" the track 30 at its edges, or around an additional edge track 39, by means of an inwardly extending flange 41, to prevent accidental disengagement of the carriers 17 and blocks 16. The length of the tunnel conveyor and the length of the tunnel assembly 14 should be sufficient for extruded annular thermoplastic parison to set into tube 20 of sufficient rigidity for the removal of mold blocks 16 without permanent distortion of the tube. Cooling plugs, and other forming means for the inside surface of the tube may be provided in a conventional manner supported on an inner core extending coaxially from the extrusion nozzle. For simplicity, such devices are not illustrated. However, additional cooling means is possible on the outer surface of the mold, as for example, by ribs 106 on its outer surface as shown in FIG. 9. Cooling water may be flowed over the exterior of the closed mold tunnel assembly to aid cooling and drain channels 108 may be provided for the water.

When the mold assembly has remained closed over a sufficient length for the tube to set, the mold blocks may be opened by hinging each of them about its hinge 28. Once open, the blocks may be removed from the tube, for example, orthogonally therefrom along removal conveyor 22. Thus the face of the mold block which was the downstream face of the tunnel run is now a side face since the orientation of the mold block remains fixed. While, as already commented, the speeds of the various conveyors should be coordinated, there is no particular reason for accurate alignment of the mold blocks 16 in tunnel formation on any of the removal conveyor 22, the return conveyor or the approach conveyor.

In practice, it is convenient that removal conveyor 22 runs at an angle of slightly more than 90° to the tunnel conveyor and that mold blocks are located on it with their tunnel axis not quite aligned with the directional axis of conveyor 22. Thus, the orientation of mold blocks 16 is the same as on tunnel conveyor 12 so that they are set at a slight angle on conveyor 22. On tunnel 12 mold blocks 16 more in the direction of the tunnel axis. Whereas, on conveyor 27 they move in a direction at slightly greater than 90° to the tunnel axis of each block 16.

It is convenient to remove the mold blocks 16 in a direction parallel with the upstream faces and the downstream faces 17 and, although sufficient guidance means should be provided to prevent them falling off the conveyor, there is no need for accurate guide means such as track 30. The guidance means may conveniently be chains 110. The provision of a guide rail 32 extending alongside removal conveyor 22 and, at least partially, alongside tunnel conveyor 12 may be useful in some instances.

When a tongue 100 and groove 102 linkage is provided between mold blocks carriers 17 (See FIG. 8) on the tunnel run, this linkage must be disconnected to allow the carriers 17 with their associated blocks 16 to travel essentially edge to edge on the removal run rather than face to face.

The linkage may comprise a rail of T-shaped cross section or, as illustrated an aligned pair of lugs 100 of T-shaped cross section on one tunnel face of a carrier, e.g. the downstream face 11 and a corresponding T-shaped groove 102 in the other face. When travelling in a tunnel direction the T-groove 102 interlocks the T-rail 100 to hold faces of adjacent blocks in register. However, when a block 16 and its associated carrier 17 are subject to an approximate 90 degree change of direction without change of orientation, as indicated, for example, by the arrow A in FIG. 8, (or in the 180 degree direction), then T-members 100 will slide out of T-grooves 102 to unlatch the carriers and allow them to move away in the new direction.

The movement of carriers 17 (and hence blocks 16) on the tunnel conveyor may be by means of driven sprocket wheels 32 which mesh with lugs 112 provided on one, or as illustrated both, sides of carriers 17. Such sprocket wheels 32 at the upstream of the tunnel run may conveniently drive the entire tunnel train of carriers 17 and mold blocks 16.

Movement of the carriers and mold blocks on removal 22, return 24, and approach 26 conveyors may be by any convenient means. However, it is to be noted that similar sprocket wheels may be used or the return run and chains 110 which may run on sprocket wheels 114 driven in any convenient manner. For additional ease in transition from one direction to another, where one conveyor adjoins another conveyor travelling in a different direction, ramps may be provided in the conveyors.

The position of hinge 28 and the comparative size of the mold block parts which are hinged together about the hinge are a matter of choice. However, it is found that the apparatus may offer advantages for the molding of large diameter tube. For example, tube diameter greater than 12" is moldable using the method and apparatus according to the invention.

As shown in FIGS. 1, 3, 4, 5, 9 and 10 the hinge of each mold block 16 is located at the top of a mold block 16 and connects mold block parts 13, 15 each of which comprises roughly half the mold block 16 although any convenient proportion may be chosen.

When hinge 28 is at the top of the mold block, it is preferable to shape the fixed part 13 (conveniently referred to as halves), fixed half 13, so that it includes the whole of the base of the mold block which connects with carrier 17 in any conventional manner. Thus the guide blocks may suitably have the shape illustrated in FIGS. 3, 4 and 5. These guide blocks have faces 42, 43 adjoining the hinge 28 which are flush with each other when the guide block is closed to lie radially of the mold tunnel. These blocks also have faces 44, 45 which are flush with each other when the guide block is closed and spaced apart from one another when the guide block is open. These faces, when the guide block is closed, lie in a plane which is oblique to the radius of the tunnel.

Figure 3:
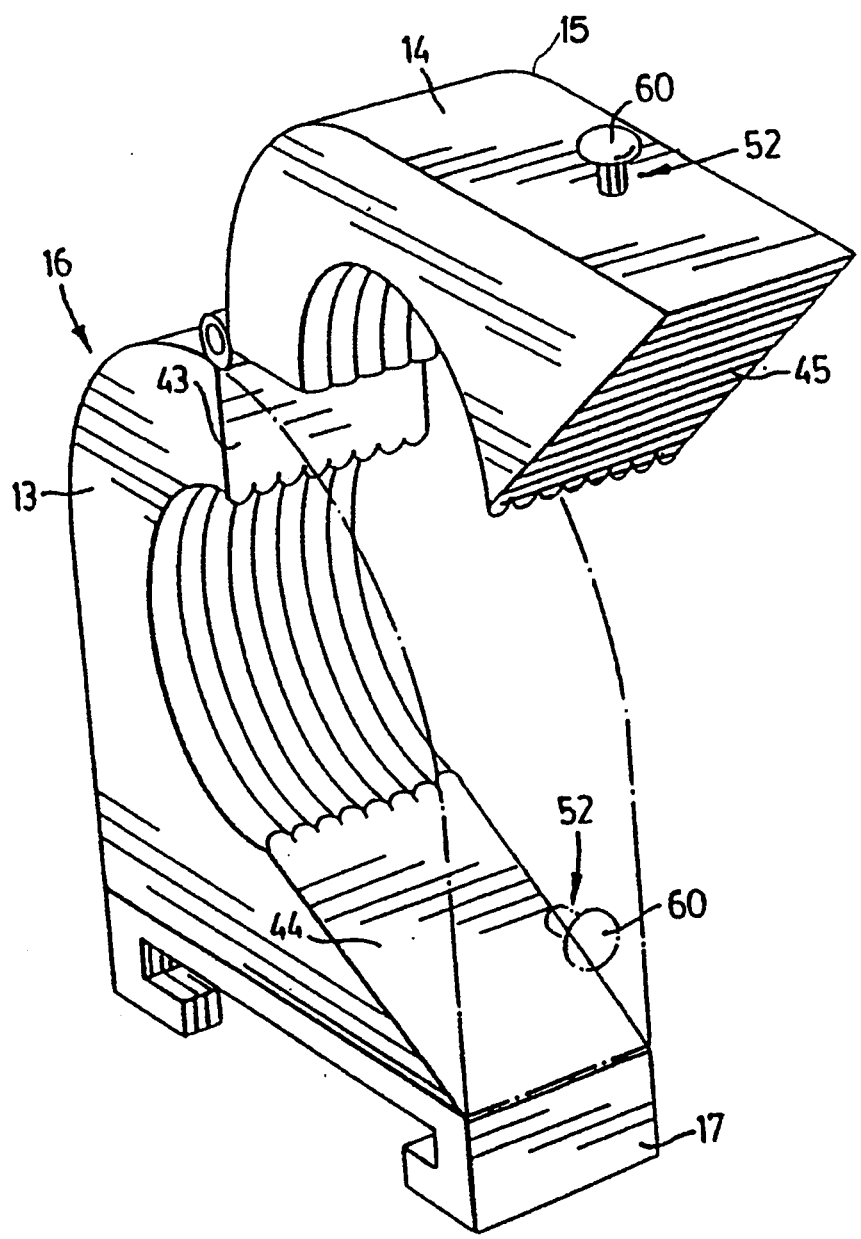
FIG. 3 is an enlarged view showing one example of a mold block and carrier which may be used with apparatus according to the invention, for example as illustrated in FIG. 1.
Figure 4:
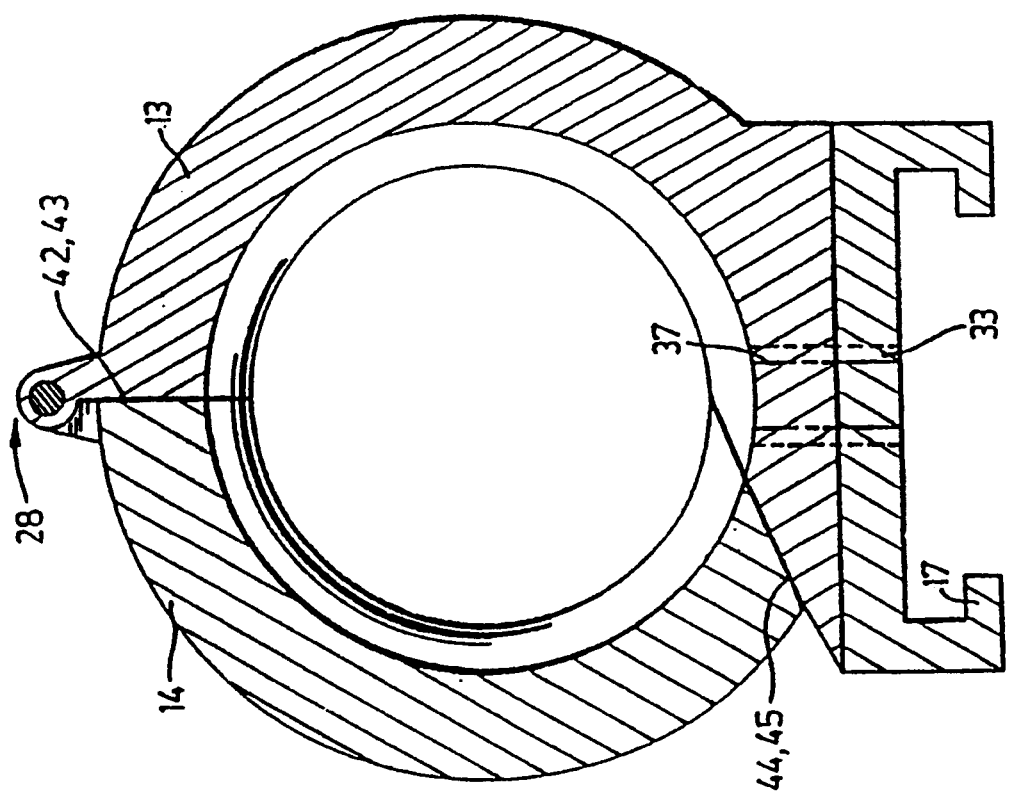
FIG. 4 is a cross section of the mold block and carrier of FIG. 3 in its closed position.
Figure 5:
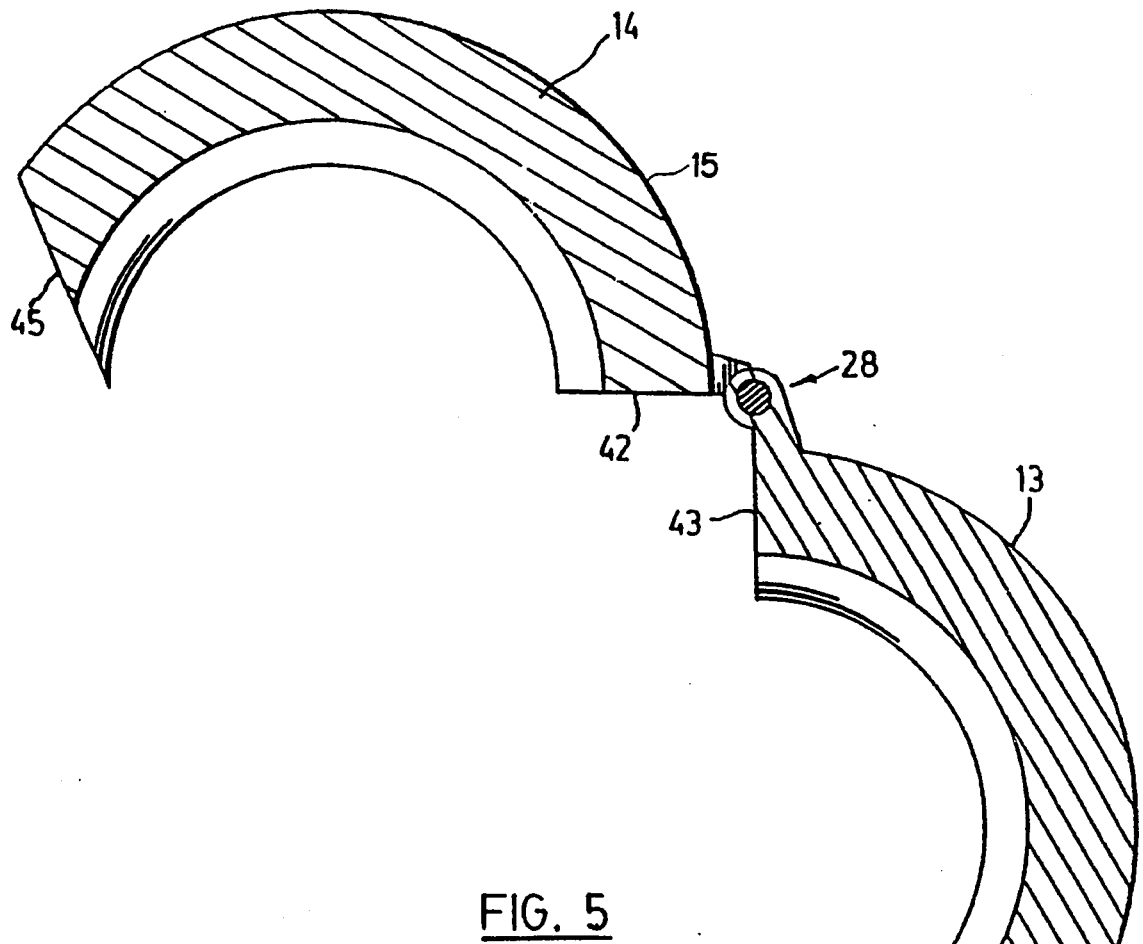
FIG. 5 is a similar cross section of the mold block of FIG. 4 in the open position.

A guide block as shaped from two asymmetric sectors as shown in FIGS. 3, 4 and 5 is advantageous in some respects in that it is easy to remove from the formed tube 20. As shown, with the hinge at the top most point of the block and the opening of the tunnel at the lower most point of the tunnel, the block is easily withdrawable from the tube in a direction orthogonal to it, for example, on the removal conveyor 22. When the block has this shape, there is no interference or dragging on the tube 20 when the opened block 16 is pulled away from it.

Figure 6:
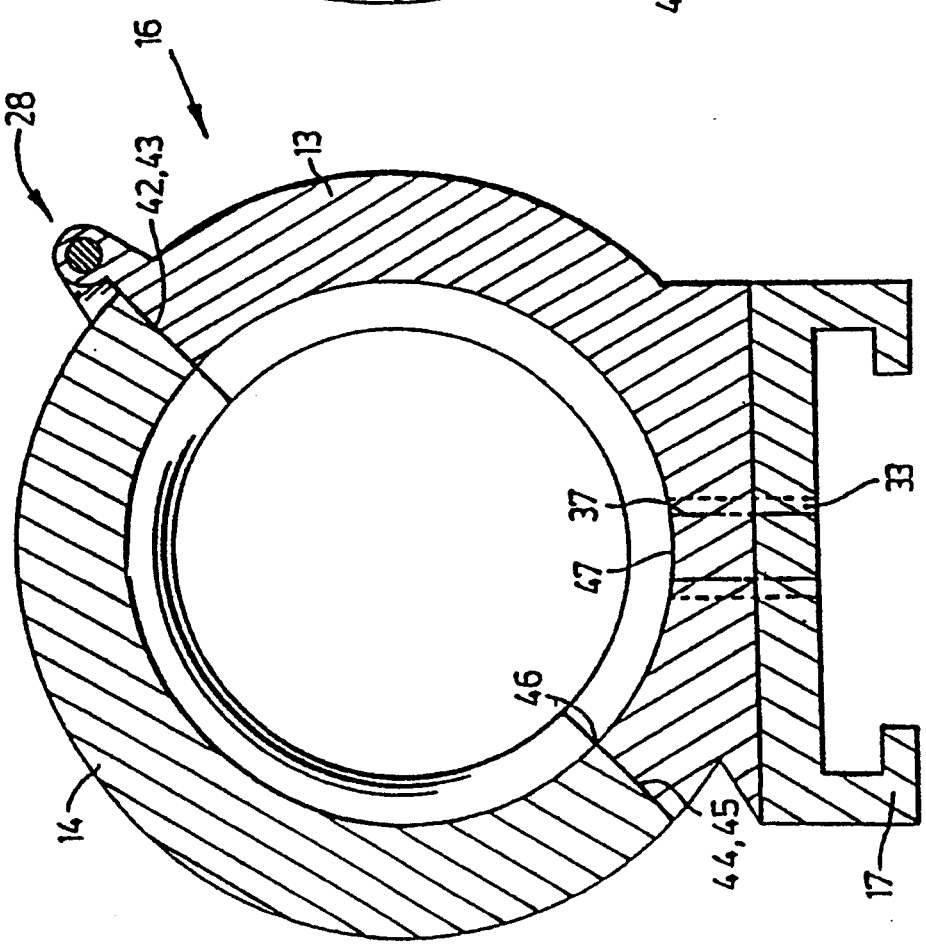
FIG. 6 is a cross section through another mold block and carrier in the closed position and suitable for use with apparatus as illustrated in FIG. 1.
Figure 7:
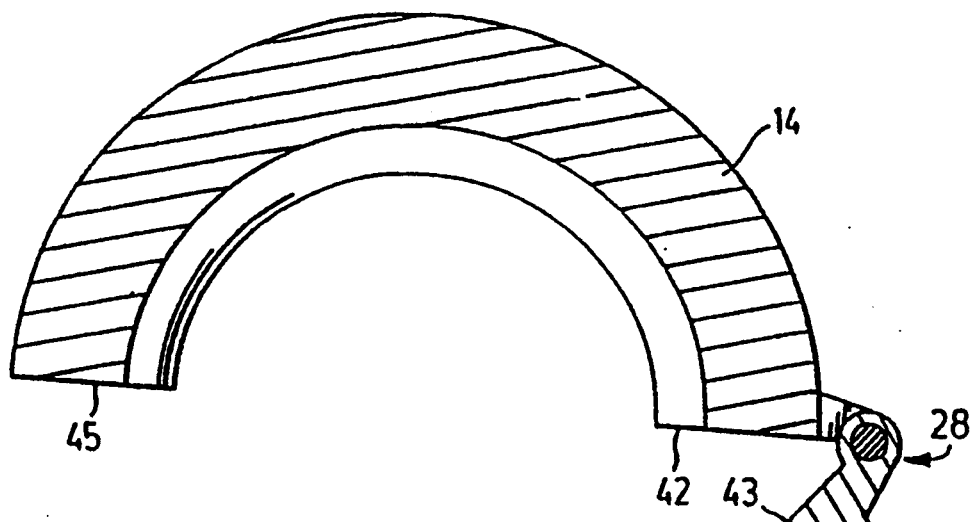
FIG. 7 is a cross section through the block of FIG. 6 in the open position.

Another desirable shape of mold block is shown in FIGS. 6 and 7. In this case, the two halves 13, 14 of the block 16 are symmetric and thus have advantages in manufacture. The hinge 28 is offset from the top of the mold block and fixed half 13 is attached carrier 17. In this case, both pairs of faces 42, 43 and 44, 45 are radial to the tunnel when the mold block is closed. However, because the hinge 28 is offset from the uppermost point of the mold block, the lower opening point of the mold block is not coincident with the lowermost point of the tunnel. Thus when an attempt is made to pull the mold block away from formed tube 20, it will tend to drag the tube 20 with it if is pulled in a strictly horizontal direction. In this case, it is desirable to adjust the level of removal conveyor 22 to be slightly lower than that of tunnel conveyor 21. The difference in height between tunnel conveyor 12 and removal conveyor 22 may be the same as the difference in height between the lower opening point 46 of the mold block and the lowest point of the tunnel 47. The conveyors 12, 22, 24 and 26 may all be in the same generally horizontal plane. Any slight reduction in height of conveyor 22 is being very slight and may be regarded as being within the same general horizontal plane as the upper runs of the other conveyors.

From conveyor 22 the mold blocks 16 and carriers 17 are transferred to return conveyor 24 which may, as shown, run parallel and opposite to the direction of tunnel conveyor 12. On return conveyor 24, the mold blocks 16 and carriers 17 are again travelling in the direction of the tunnel axis and will probably, due to the speed be close together in tunnel formation and, again linked through T-bars 100 and T-grooves 102. There is, however, no theoretical need to ensure that they fit tightly together with their upstream and downstream faces in tight flush fit. Nor is there a need to provide for accurate alignment of the tunnel. Therefore, for conveyor 24, there is no need to provide a track similar to track 30. The faces of the mold block which were downstream faces on the tunnel run are now upstream faces because the orientation of the mold blocks is fixed.

At the end of conveyor 24 the mold blocks change direction again onto approach conveyor 26 in a similar manner to the changes of direction before described. Now the faces of the mold blocks which were downstream faces on the tunnel run are, again, side faces because the orientation of the mold blocks is fixed. When on approach conveyor 26, at least when approaching extrusion nozzle 18, it is important that the mold blocks be in open position. It is possible to start closing the mold blocks before they reach extrusion nozzle 18, provided there is sufficient clearance between the hinged half 14 and the extrusion nozzle as the mold moves into position for the start of another mold tunnel run.

As the open mold block 16 approaches the beginning of the mold tunnel conveyor 12 and the extrusion nozzle 18, it may be closed by any convenient means.

One means of opening and closing the mold blocks 16 is shown in FIG. 1. A cam track 50 may be provided following the general layout of conveyors 12, 22, 24, 26. Cam track may be of C-section to accept and retain the heads of 60 mushroom lugs 52 (exteriors) outwardly from hinged half 14 of each mold block. Along the tunnel conveyor 12, a continuous cam track 50 opens inwardly and is located at a height lateral of the conveyor 12, as to maintain the mold blocks closed. As the downstream end of conveyor 12 approaches, cam track 50 rises to hingedly raise each mold half 14 and open the mold block 16. The path of cam track 50 follows the track of the leads 60 of the mushroom lugs 52 and, as the mold blocks 16 changes direction onto the removal conveyor, twists so that it opens downwardly. The cam track 50 may rise to hingedly raise the mold half 18 through 180° but this is not necessary. It may be easier to only open the mold block 16 sufficiently for removal of tube 20. The cam track 50 may be maintained at this height over the removal conveyor 22, the return conveyor 24 and the approach conveyor 26. At the downstream end of the approach conveyor 26, the cam track descends to close the mold block 16 and twists to open again towards the tunnel conveyor 12.

Figure 8:
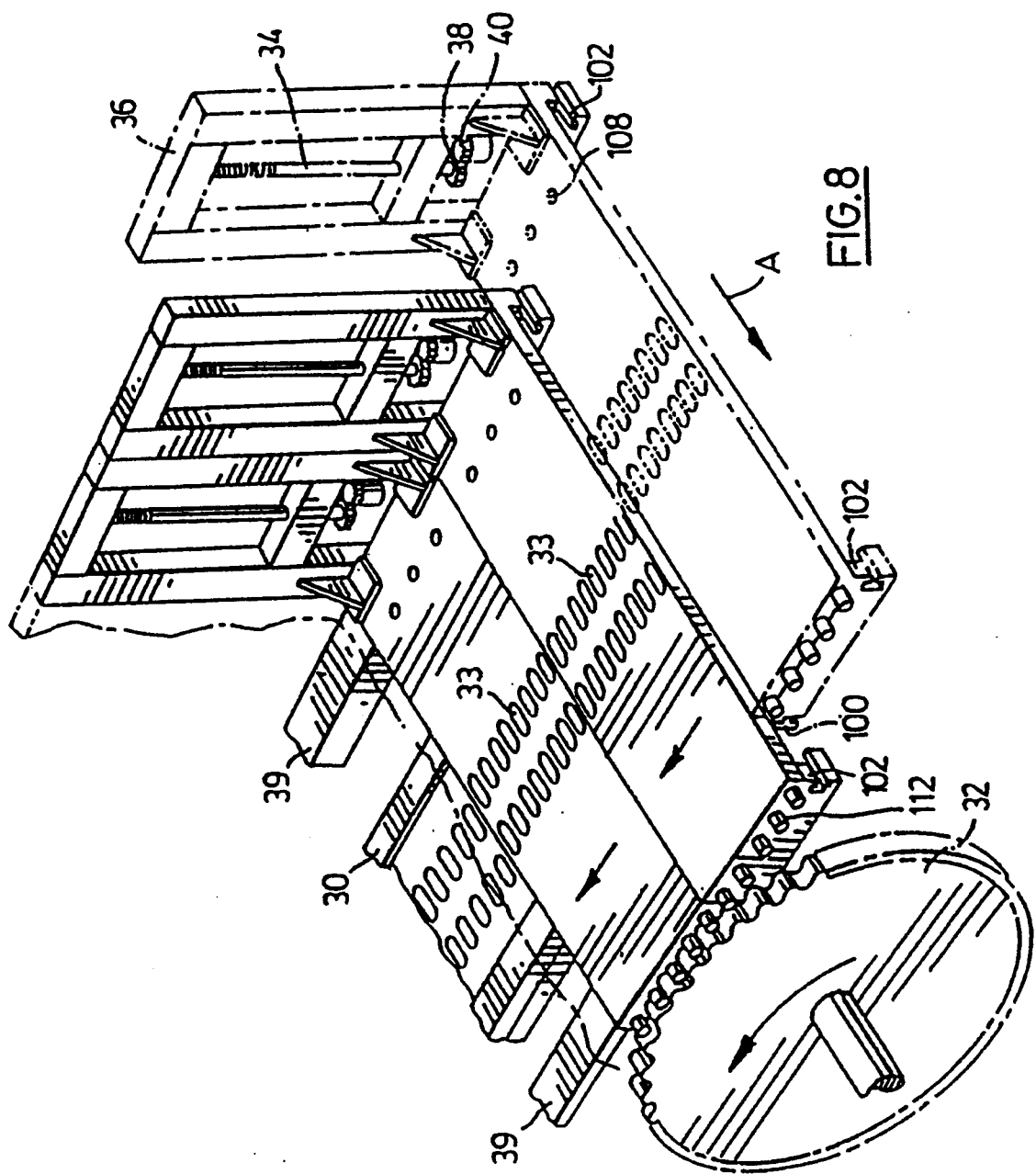
FIG. 8 is a view of carriers, suitable for use in apparatus as illustrated in FIG. 2.
Figure 10:
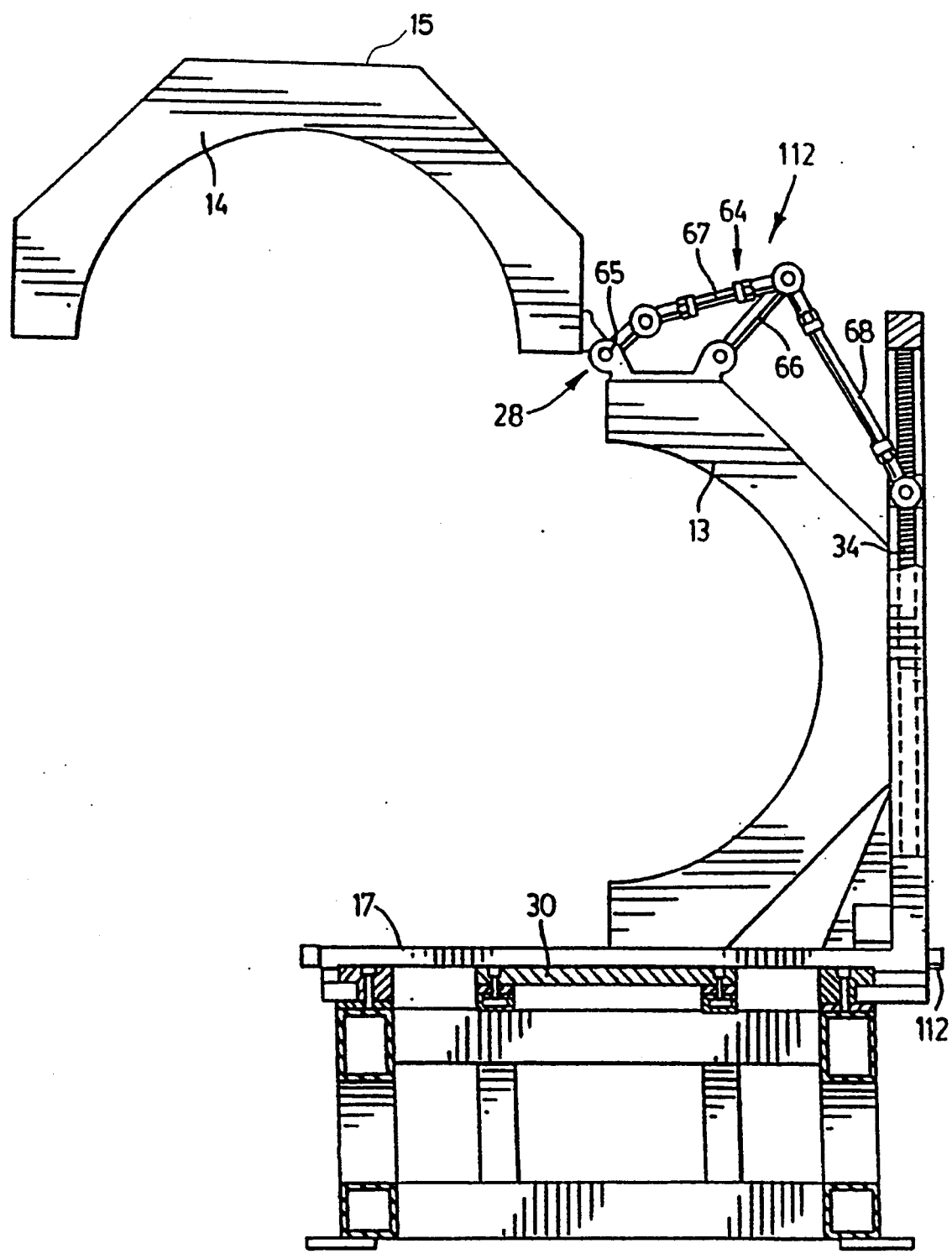
FIG. 10 is a view of the mold block of FIG. 9 in the open position.

A preferred manner of opening and closing the mold blocks 16 is illustrated in FIGS. 8, 9, and 10, which illustrate a mold block 16 and a carrier 17 having mold opening mechanism carried by the carrier. This mold opening mechanism comprises screw threaded vertical spindle 34 carried in an upstanding framework side 36 of carrier 17. At its lower end spindle 34 carries sprocket wheel 38 geared to actuating sprocket wheel 40.

Actuating sprocket wheel 40 may be powered by any convenient means such as an electric motor or other motor. Alternatively, at least on the tunnel run, a rack 46 may be provided so that motion of the carriers past the rack 46 will engage wheel 40 or 38 to turn spindle 34.

Turning of spindle 34 in the direction shown by arrow-B in FIG. 9 will lower block 48 engaged on the spindle 34. Block 48 has an axle 62 projecting to either side of it carrying one end of an articulated arm 64, comprising a member 65 hinged to hinged mold block half 14, a member 66 hinged to fixed mold block half 13, a rigid link 67 pivotally connected at its respective ends to members 65 and 66, and a member 68 pivotally connected at one end to member 66 and link 678 and, at the other end to block 48.

As block-48 descends spindle 34 the action of articulated arm 64 is to open mold block as shown in FIG. 10.

The outer surface of mold blocks 16 may have cooling ribs 70.

I claim:

1. Apparatus for continuous molding of thermoplastic extrudate in a travelling mold tunnel to form an elongate molding, comprising:
    a travelling tunnel mold assembly of adjacent mold blocks each mold block having a bore therethrough, the bores of adjacent mold blocks being aligned axially;
    each mold block comprising a pair of pivotally connected parts whereby the parts are movable between a closed position of
    each mold block comprising a pair of pivotally connected parts whereby the parts are movable between a closed position of the block in which the bore is circumferentially enclosed, and an open position in which the parts are located with respect to each other to release elongate molding formed between them;
    a tunnel conveyor for the tunnel mold assembly to convey it horizontally and axially in a molding run between a tunnel entrance and a tunnel exit;
    means to open each mold block as it reaches the tunnel exit;
    means to return each mold block on a return path from the tunnel exit to the tunnel entrance, upstream of the return path, said means to return including removal, return, and approach conveyors each lying generally in a horizontal plane common to that of the tunnel conveyor and adapted to communicate each mold block from the tunnel exit to the tunnel entrance while each mold block is oriented with its bore parallel to the tunnel axis during travel on the return path; and
    means to close the returned mold blocks to form the mold tunnel.

2. Apparatus as claimed in claim 1, in which the mold block bore is circular in cross-section.

3. Apparatus as claimed in claim 2, in which each mold block (16) is carried on a mold block carrier (17).

4. Apparatus for continuous molding of thermoplastic extrudate in a travelling mold tunnel to form an elongate molding, comprising:
- a travelling tunnel mold assembly of adjacent mold blocks, each mold block being carried on a mold block carrier, and each mold block having a bore therethrough, the bores of adjacent mold blocks being aligned axially and having a circular cross-section;
- each mold block comprising a pair of pivotally connected parts where the connected parts are movable between a closed position of the block in which the bore is circumferentially enclosed and an open position in which the connected parts are located with respect to each other to release elongate molding formed between them;
- a tunnel conveyor for the tunnel mold assembly to convex it horizontally and axially in a molding run between a tunnel entrance and a tunnel exit;
- means to open each mold block as it reaches the tunnel exit;
- means to return each mold block on a return path from the tunnel exit to the tunnel entrance, upstream of the return path, and means to close the returned mold blocks to form the mold tunnel, said means for returning including:
  - a removal conveyor arranged to move generally in the plane of the tunnel conveyor to receive and convey each opened mold block sequentially from the tunnel conveyor, each mold block being orientated with its bore parallel to the mold tunnel;
  - a return conveyor generally in the plane of the tunnel conveyor arranged to move horizontally parallel and opposite to the tunnel conveyor to receive and convey mold blocks sequentially from the removal conveyor, each mold blocks being orientated with its bore parallel to the mold tunnel; and
  - an approach conveyor generally in the plane of the tunnel conveyor arranged to move horizontally and parallel to the removal conveyor, to convey mold blocks sequentially from the return conveyor, each mold block being orientated with its bore parallel to the mold tunnel, the mold block being of fixed orientation with its bore parallel to the tunnel axis during travel on all of the return path to be added to the tunnel entrance.

5. Apparatus as claimed in claim 4 in which means are provided to maintain the mold blocks (16) closed on the tunnel conveyor (12).

6. Apparatus as claimed in claim 5 in which the means comprises a cam actuated latch (50, 52) between the mold parts.

7. Apparatus as claimed in claim 5 in which the cam actuated to maintain the mold blocks (76) closed comprises a cam channel (50) slidably engaging a lug (52) of each mold block (16).

8. Apparatus as claimed in claim 7 in which the cam channel (50) is continuous and is located at a height above the conveyors (12, 22, 24, 26) to maintain mold blocks (16) closed during travel along the tunnel conveyor (12) and open on the removal, return and approach conveyors (22, 24, 26).

9. Apparatus as claimed in claim 4 in which the means to open the mold block (16) and the means to close the mold blocks (104) comprises a rotatable screw threaded spindle (34) on each mold block carrier (17), a member (48) screw threadedly engaging the spindle (34) for axial adjustment of its location thereon by rotation of the spindle (34), and articulated linkage (64, 75, 66, 67, 68) between said member (48) and the respective mold block (16) pivotally connected parts (13, 15) for opening and closing of the mold blocks (16) a dependance on the axial location of said member (48).

10. Apparatus as claimed in claim 9 in which the spindle (34) is driven in an opening direction for the mold blocks (16) by a gear wheel (40) engaging a rack (46) located on the tunnel conveyor (12).

11. Apparatus as claimed in claim 4, in which one fixed part (13) of each pair of mold block parts (13, 15) is, in use, attached at its base to its respective mold block carrier (17), and is provided with a hinge (28) at the top of the mold block for pivotal connection with the other movable part (15) of said pair.

12. Apparatus as claimed in claim 11 in which abutting faces (44, 45) of the fixed and movable mold block parts (13, 15) distant from the hinge (28) lie in a plane oblique to the radius of the bore.

13. Apparatus as claimed in claim 4 in which one fixed part (13) of each pair of mold blocks (16) in use, attached at an attachment point of its respective carrier, and is provided with a hinge (28) offset from the top of the mold block (16) for pivotal connection with the other movable part (13) of said pair.

14. Apparatus as claimed in claim 13 in which abutting faces (44, 45) distant from the hinge (28) of the fixed part (13) and the movable part (15) are offset from the base of the mold block and radially arranged and diametric with hinge faces (42, 43) of the fixed and movable parts (13, 15).

15. Apparatus as claimed in claim 14 in which, at the downstream end of the tunnel and downstream of the means to open each mold block (16), means are provided to lower the mold blocks on the tunnel conveyor to release formed tube (20) from the face (44) of the fixed mold part offset from the base.

16. Apparatus as claimed in claim 14 in which the tunnel conveyor comprises a fixed guide (30, 39) and drive means (32, 112) are provided to drive mold blocks (16) to move over the guide (30, 39).

17. Apparatus as claimed in claim 15 in which the drive means comprise a drive sprocket wheel (32) sequentially engaging drive tugs (112) projecting from each mold block carrier (17).

18. Apparatus as claimed in claim 4 in which engagement means (100, 102) are provided for sliding engagement of adjacent mold blocks (16) on the tunnel conveyor (12).

19. Apparatus as claimed in claim 18 in which the engagement means comprises for each mold block, a groove (102) along one of a leading edge and a tracking edge of each mold block carrier (17) and a tongue (100) adapted to make with the groove (102) of the other of the leading and tracking edges.

20. A method for continuous molding of thermoplastic extrudate in a travelling mold tunnel to form an elongate molding, comprising the steps of;
- extruding a parison of thermoplastic extrudate into a travelling tunnel mold assembly of adjacent hinged mold blocks each mold block being pivotable between the closed mold tunnel forming position and an open position having a bore therethrough, the bore of adjacent mold blocks being aligned axially, conveying the tunnel mold assembly in a horizontal plane and axially in a molding run between a tunnel entrance and a tunnel exit;

opening each mold block as it reaches the tunnel exit;

returning each mold block along a substantially horizontal return path which is generally coplanar with the molding run from the tunnel exit to the tunnel entrance upstream of the return path, and closing the returned mold blocks to form the mold tunnel.

21. A method as claimed in claim 20, for molding tube (20).

22. A method as claimed in claim 21, in which the mold block bore is circular in cross-section.

23. A method as claimed in claim 22, in which each mold block (16) is carried on a mold block carrier (17).

24. A method for continuous molding of thermoplastic extrudate in a travelling mold tunnel to form an elongate molding, comprising;

extruding a parison of thermoplastic extrudate into a travelling tunnel mold assembly of adjacent mold blocks each mold block having a bore therethrough, the bore of adjacent mold blocks being aligned axially, each mold block comprising a pair pivotally connected parts whereby the parts are movable between a closed position of the block in which the bore is peripherally enclosed, and an open position in which the parts are located, with respect to each other, to release the elongate molding formed between them;

conveying the tunnel mold assembly horizontally and axially in a molding run between a tunnel entrance and a tunnel exit;

opening each mold block proximate to the tunnel exit;

returning each mold block on a return path from the tunnel exit to the tunnel entrance upstream of the return path by removing opened mold blocks from the tunnel conveyor onto a removal conveyor generally running in the plane of the tunnel conveyor, and receiving and conveying each opened mold block sequentially from the tunnel conveyor, each mold block being orientated with its bore parallel to the mold tunnel; and transferring the opened mold blocks from the removal conveyor to a return conveyor generally in the plane of the tunnel conveyor running horizontally parallel and opposite to the tunnel conveyor, and receiving and conveying mold blocks sequentially from the removal conveyor, each mold block being orientated with its bore parallel to the mold tunnel; and transferring the mold blocks from the return conveyor to an approach conveyor generally in the plane of the tunnel conveyor running horizontally and parallel to the removal conveyor, receiving and conveying mold blocks sequentially from the return conveyor, each mold block being orientated with its bore parallel to the mold tunnel;

maintaining the mold blocks to be added to the tunnel entrance in a fixed orientation with their bore parallel to the tunnel axis; and closing the returned mold blocks proximate to the tunnel entrance to form the mold tunnel.

25. A method as claimed in claim 24, including latching the mold blocks (16) closed on the tunnel conveyor (12).

26. A method as claimed in claim 25, in which the mold blocks (16) are opened at the tunnel exit by a cam channel (50) slidably engaging a lug (52) of each mold block (16) the channel (50) rising to lift the respective mold block part (15) and thereby open the mold block (16).

27. A method as claimed in claim 26, in which the mold blocks (16) are maintained open on the removal, return and approach conveyors (22, 24, 26).

28. A method as claimed in claim 24 in which mold blocks (16) are opened and closed through rotation of a screw threaded spindle (34) acting to adjust the axial location of a member (48) in screw threaded engagement therewith, through articulated linkage (64, 65, 67, 68) with the respective mold block parts (13, 15).

29. Apparatus for continuous molding of thermoplastic extrudate in a travelling mold tunnel to form an elongate molding, comprising:

a travelling tunnel mold assembly of alignable, pivotally hinged, mold blocks each having an axially alignable bore therethrough and each mold block being pivotal between a closed tunnel-forming position and an open position and each mold block being drivable connected to a motor for opening and closing the mold block;

a generally planar conveyor for conveying the mold blocks in a pathway generally lying in a common plane where the pathway includes an axially extending molding run between a tunnel entrance and a tunnel exit, a lateral removal run to move an individual mold block away from the tunnel exit, a return run generally parallel to the axial molding run, and an approach run for guiding the mold block to the tunnel entrance; and means to close the mold block at the tunnel entrance to form the mold tunnel.

30. A method for continuous molding of thermoplastic extrudate in a travelling mold tunnel to form an elongate molding, comprising;

extruding a parison of thermoplastic extrudate into a travelling tunnel mold assembly of adjacent mold blocks each mold block having a bore therethrough, the bore of adjacent mold blocks being aligned axially, each mold block comprising a pair pivotally connected mating sections which are movable between a closed position and an open position;

conveying the tunnel mold assembly horizontally and axially in a molding run between a tunnel entrance and a tunnel exit;

opening each mold block proximate to the tunnel exit;

establishing a generally horizontally disposed return path co-planar with the molding run, the return path being defined by a removal run, a return run, and an approach run where the removal and approach runs are generally parallel to each other and both are generally perpendicular to the return run; and returning each mold block on the return path from the tunnel exit to the tunnel entrance upstream of the return path.

* * * * *